United States Patent Office 2,724,638
Patented Nov. 22, 1955

2,724,638

PURIFICATION OF SPENT SULFURIC ACID

Walter H. C. Rueggeberg, Fulton County, Ga., assignor to Tennessee Corporation, New York, N. Y., a corporation of New York No Drawing. Application December 11, 1951,
Serial No. 261,157

2 Claims. (Cl. 23—172)

This invention relates to the production of sulfuric acid of sufficient purity and strength to be usable for various industrial purposes, and more particularly to the production of such sulfuric acid solutions from spent acid reaction mixtures containing sulfuric acid contaminated with sulfonated material as a major impurity and also with a relatively minor amount of organic matter and other impurities.

By way of example, the invention will be described hereinafter with particular reference to the production of a reasonably clean and strong sulfuric acid solution from a spent acid reaction mixture obtained in the manufacture of DDT (dichloro-diphenyl-trichloroethane). In the manufacture of DDT, two moles of chlorobenzene are condensed with one mole of chloral (or chloral hydrate) using excess sulfuric acid and/or oleum as a condensing agent, and a side reaction takes place in which a substantial amount of chlorobenzene sulfonic acid is formed by sulfonation of chlorobenzene. The spent reaction mixture remaining after separation of DDT thus contains not only a large quantity of sulfuric acid, but also a smaller but substantial quantity of sulfonic acid together with minor amounts of other materials such as water, hydrochloric acid, and both volatile and non-volatile organic matter. For example, such spent reaction mixtures may contain from about 65 to 75% sulfuric acid and 20% to 30% sulfonic acid, the remainder comprising water together with traces of hydrochloric acid and small quantities of organic matter. It is to be understood that the invention is applicable to mixtures of this or similar composition from whatever source they may be obtained.

When such a spent reaction mixture is allowed to stand with exposure to air at ordinary temperatures, chlorobenzene sulfonic acid gradually crystallizes out at the exposed surfaces of the mixture, most probably as the hydrate. Furthermore, dilution of the spent reaction mixture with water results in the eventual crystallization of the sulfonic acid and its precipitation in the form of a jelly-like mass throughout the reaction mixture, and even the fresh diluted reaction mixture is rather viscous. Hence the spent sulfuric acid, as it is found in the reaction mixture, is unsuitable for many industrial operations involving the use of liquid acid of normal viscosity, and the use of the spent reaction mixture for acidification is objectionable not only because of the presence of impurities but also in view of the risk of crystallization in pipe lines and other equipment.

The separation of impurities and the recovery of usable sulfuric acid from such spent reaction mixtures by ordinary methods such as filtration is difficult to achieve. For example, when the reaction mixture is diluted with water up to about 55% by weight and cooled to about 20° C., a heavy precipitation of chlorobenzene sulfonic acid takes place, but a thick immobile paste is formed which is difficult to move and handle. At higher dilutions the sulfonic acid remains partially or entirely in solution unless the mixture is further cooled say to 0° C. or less, and even then filtration is difficult and precipitation of impurities may be incomplete.

The present invention makes possible the separation of the sulfuric acid in such mixtures from the sulfonic acid and other contaminating impurities by means of simple filtration, centrifugation, or like conventional methods, and produces a sulfuric acid solution of sufficient purity and strength that it is well suited for many industrial purposes. At the same time the process makes it possible to adjust the strength of the recovered sulfuric acid solution to any value within reasonable limits that may be desired for particular purposes.

The foregoing results are obtained by a procedure which, briefly stated, comprises the steps of diluting the spent reaction mixture with a suitable quantity of water, then adding concentrated sulfuric acid to precipitate the impurities, and then separating the precipitated material from the mixture. The addition of the concentrated sulfuric acid eliminates the difficulties encountered when the mixture is simply diluted with water as described above and results in a prompt and almost quantitative separation of impurities in the form of easily filterable solids. Moreover, the sulfuric acid recovered from the diluted spent reaction mixture is fortified by the addition of the concentrated sulfuric acid to a strength desirable for industrial use. The filtrate then consists of substantially pure sulfuric acid of good color and of a strength that will depend on the amounts of added water and concentrated sulfuric acid and that can easily be adjusted to fall within a range suitable for industrial purposes such as the acidulation of phosphate rock in the manufacture of phosphatic fertilizer.

For practical purposes, the desirable strength of the recovered sulfuric acid will usually be at least 60%, although this is not necessary in all cases. The maximum strength of the recovered sulfuric acid, on the other hand, is limited by the fact that the chlorobenzene sulfonic acid will redissolve when the amount of concentrated sulfuric acid added to the reaction mixture is sufficient to fortify the recovered acid to about 77% $H_2SO_4$ or above. Within this upper limit, however, the amount of fortifying acid used can be varied to provide a recovered sulfuric acid of desired strength, due allowance being of course made for the amount of water of dilution. For example, in the manufacture of superphosphate sulfuric acid of about 68% strength is ordinarily employed, and when the recovered acid is to be used for this purpose its strength can be adjusted to about this value.

In general, the amount of dilution water may range from about 40% to about 80% by weight of the spent acid reaction mixture. But, higher dilutions increase the amount of material that must be handled and may make it advisable to use lower temperatures, whereas at very low dilutions the mixture may become rather viscous and somewhat difficult to handle. From the standpoint of ease of operation, therefore, it will usually be advantageous to dilute the spent reaction mixture with 50–60% of its weight of water at a temperature in the neighborhood of 20° C. In most cases a mixture sufficiently mobile for convenient and efficient operation and of relatively small volume for ease of handling can be obtained at 50% dilution.

By way of example, a typical spent reaction mixture obtained in the manufacture of DDT as described above had the following composition:

| | Per cent |
|---|---|
| Sulfuric acid | 66.4 |
| Chlorobenzene sulfonic acid | 27.1 |
| Hydrochloric acid | 1 |
| Water insoluble volatiles, less than | 1 |
| Non-volatile organic matter, less than | 1 |
| Water (by difference) | 5.5 |
| Total acidity (calc. as $H_2SO_4$) | 74.7 |
| Color, dark brown to black. | |

101.9 grams of the above spent acid reaction mixture were poured into 52.5 grams of ice water (the use of ice water is not essential but cooling will usually be desirable because the heat of solution is high). The temperature of the diluted mixture rose to 70–75° C., and some HCl vaporized out due to the rise of temperature. Subsequently 88.6 grams of 96.4% $H_2SO_4$ were added rapidly to the diluted reaction mixture at a temperature of 40° C. The temperature of the mixture then rose to 75–80° C. and a fluid mix was produced from which the impurities separated upon cooling to 42° C. In order to assure complete precipitation the mass was further cooled to 20° C., whereupon with only slight agitation an easily movable pasty mass resulted. The mixture was then filtered with suction on a Buchner funnel, using a filter pad preferably of glass cloth. The filter cake was pressed by hand using a 2 inch diameter glass plug.

A total of 50.9 grams of solid material was recovered from the filter, this material being completely soluble in water except for some haziness due to organic matter. Upon analysis, the filter cake was found to have the following composition, the chlorobenzene sulfonic acid content being calculated from the difference between total acidity and $H_2SO_4$:

| | Per cent |
|---|---|
| Total acidity (calc. as $H_2SO_4$) | 40.2 |
| Sulfuric acid ($H_2SO_4$) | 26.05 |
| Chlorobenzene sulfonic acid | 55.63 |
| Water (by difference) | 18.32 |

The filtrate, on the other hand, amounted to 191.7 grams and had a total acidity of 72.7% calculated as $H_2SO_4$. Because the removal of sulfonic acid was essentially complete, the filtrate was considered to be 72.7% sulfuric acid. This filtrate had a clear, straw-yellow color and nearly the same viscosity as pure $H_2SO_4$ of equivalent strength. It was virtually free of objectionable impurities and did not deposit further solids even when cooled to 3° C.

It will be seen that 99.7% of the total sulfuric acid, including the spent sulfuric acid in the reaction mixture and the concentrated sulfuric acid added thereto, was accounted for in the filter cake and in the filtrate. The sulfuric acid content of the filtrate amounted to 79.7% of the sulfuric acid in the original spent reaction mixture plus all of the concentrated sulfuric acid charged thereto. The amount of sulfuric acid in the filter cake was only 19.6% of the available acid in the spent reaction mixture.

In case a purified sulfuric acid solution of only 68% strength should be desired for particular purposes such as described above, then the ratios of water and concentrated sulfuric acid used to the spent acid can be calculated and adjusted accordingly. In the case of the spent reaction mixture described above, for example, the following proportions may be used in order to obtain a 68% acid solution:

| | Parts by weight |
|---|---|
| Spent reaction mixture | 100 |
| Water | 63.6 |
| 96.4% $H_2SO_4$ | 87.1 |

Other typical examples of the results obtainable with a process embodying the invention, using various amounts of dilution water and concentrated (96.4%) sulfuric acid at 20–25° C., are shown in the following table:

| Amount Spent Acid Used, grams | Degree of Dilution, Percent of Water of Spent Acid Weight | Amount of $H_2SO_4$ Added, grams | Weight of Fortified Acid Recovered by Filtration, grams | $H_2SO_4$ in Filtered Acid | Weights of Solids Filtered Off,[1] grams |
|---|---|---|---|---|---|
| 100 | 80 | 107.8 | 236 | 66.1 | 49.0 |
| 100 | 70 | 85.6 | 203.5 | 66.1 | 52.4 |
| 100 | 40 | 19.6 | 98.6 | 66.3 | 47.0 |
| 100 | 51.5 | 84.0 | 188.3 | 72.7 | 50.0 |
| 100 | 67 | 34.6 | 153.2 | 60.2 | 45.0 |

[1] Mainly chlorobenzenesulfonic acid.

Thus it will be seen that the invention makes it possible to separate spent acid reaction mixtures of the type described above conveniently and rapidly into their major components and to produce a reasonably clean sulfuric acid solution substantially free of objectionable impurities and of strength suitable for commercial use. The material balances are good and the degree of extraction of sulfuric acid from the reaction mixture is high, being better than 79% in the example given above. The whole procedure is both simple and efficient.

It will be understood that the invention is not restricted to the details of the examples specifically set forth above and that reference should be had to the appended claims for a definition of its limits.

What is claimed is:

1. A process for the production of substantially pure sulfuric acid from a spent acid reaction mixture obtained in the manufacture of dichloro-diphenyl-trichloro-ethane by the condensation of chlorobenzene and chloral using sulfuric acid as a condensing agent, said process comprising the steps of diluting the spent acid reaction mixture with about 40–80% of its weight of water, adding concentrated sulfuric acid to the diluted reaction mixture producing a mixture temperature of approximately 75–80° C., and then precipitating material from the mixture by cooling to the neighborhood of 42–20° C. to provide a purified sulfuric acid solution, the amount of said added concentrated sulfuric acid being sufficient to increase the strength of said purified solution to a value between 60% and 77%.

2. A process for the production of substantially pure sulfuric acid from a spent acid reaction mixture containing about 65–75% sulfuric acid together with about 20–30% chlorobenzene sulfonic acid and a relatively small amount of organic matter, comprising the steps of diluting the spent acid reaction mixture with about 50–60% of its weight of water, adding concentrated sulfuric acid to the diluted reaction mixture producing a mixture temperature of approximately 75–80° C. and then precipitating material from the mixture by cooling to the neighborhood of 42–20° C., the amount of added concentrated sulfuric acid being sufficient to provide a purified sulfuric acid solution of about 68% strength.

References Cited in the file of this patent

UNITED STATES PATENTS

| | | |
|---|---|---|
| 2,287,732 | Frey et al. | June 23, 1942 |
| 2,302,825 | Wilde | Nov. 24, 1942 |
| 2,447,326 | Gates et al. | Aug. 17, 1948 |
| 2,464,265 | Searle | Mar. 15, 1949 |
| 2,610,906 | Dunning | Sept. 16, 1952 |

OTHER REFERENCES

Industrial and Eng. Chem., pages 211–214, vol. 38, No. 2 of February 1945.